(12) United States Patent
Cui et al.

(10) Patent No.: US 11,897,564 B2
(45) Date of Patent: Feb. 13, 2024

(54) SPATIAL INTEGRATION MODULE

(71) Applicant: GOODRV (QINGDAO) CAMPGROUND EQUIPMENT CO., LTD, Shandong (CN)

(72) Inventors: Yanfeng Cui, Shandong (CN); Zuoer Cui, Shandong (CN); Lingzhi Shi, Shandong (CN)

(73) Assignee: GOODRV (QINGDAO) CAMPGROUND EQUIPMENT CO., LTD, Shandong (CN)

( * ) Notice: Subject to any disclaimer, the term of this patent is extended or adjusted under 35 U.S.C. 154(b) by 487 days.

(21) Appl. No.: 17/415,744

(22) PCT Filed: Dec. 24, 2018

(86) PCT No.: PCT/CN2018/123147
§ 371 (c)(1),
(2) Date: Jun. 18, 2021

(87) PCT Pub. No.: WO2020/124617
PCT Pub. Date: Jun. 25, 2020

(65) Prior Publication Data
US 2022/0084391 A1 Mar. 17, 2022

(30) Foreign Application Priority Data
Dec. 19, 2018 (CN) .......................... 201822140120.8

(51) Int. Cl.
| B62D 63/06 | (2006.01) |
| B60P 3/34 | (2006.01) |
| E04B 1/348 | (2006.01) |
| G08B 29/02 | (2006.01) |
| E04B 1/344 | (2006.01) |

(52) U.S. Cl.
CPC .............. B62D 63/061 (2013.01); B60P 3/34 (2013.01); E04B 1/348 (2013.01); E04B 1/3445 (2013.01); G08B 29/02 (2013.01)

(58) Field of Classification Search
CPC ....... B62D 63/061; B60P 3/34; E04B 1/3445; B60J 7/141
USPC ..................................... 296/165, 173, 26.06
See application file for complete search history.

(56) References Cited

U.S. PATENT DOCUMENTS
2016/0023756 A1   1/2016   Carreker

FOREIGN PATENT DOCUMENTS
| CN | 202922120 | 5/2013 |
| CN | 203612080 | 5/2014 |
| CN | 104389449 | 3/2015 |

OTHER PUBLICATIONS

"International Search Report (Form PCT/ISA/210) of PCT/CN2018/123147," dated Sep. 19, 2019, with English translation thereof, pp. 1-4.

*Primary Examiner* — Jason S Morrow
(74) *Attorney, Agent, or Firm* — JCIP GLOBAL INC.

(57) ABSTRACT

A spatial integration module includes a chassis, a wall body, a top cover and supporting devices. Each supporting device comprises a lower fixed portion and an upper movable portion. The wall body is detachably connected to the chassis and/or the supporting devices. The fixed portions are mounted on the chassis. A fixed rotation structure is arranged at a position where each movable portion is connected to the corresponding fixed portion. Each movable portion is turned between a horizontal direction state and a vertical direction state by the rotation structure.

12 Claims, 9 Drawing Sheets

SPATIAL INTEGRATION MODULE

CROSS-REFERENCE TO RELATED APPLICATION

This application is a 371 of international application of PCT application serial no. PCT/CN2018/123147, filed on Dec. 24, 2018, which claims the priority benefit of China application no. 201822140120.8, filed on Dec. 19, 2018. The entirety of each of the above mentioned patent applications is hereby incorporated by reference herein and made a part of this specification.

BACKGROUND

Technical Field

The disclosure relates to the technical field and particularly to a spatial integration module.

Description of Related Art

During the transportation process of cargoes, containers are often required to provide the storage space for these cargoes. In some devices such as recreational vehicles, container housings, movable warehouses, and movable garages, it is necessary to enclose and build certain container bodies to meet the corresponding requirements on space.

To meet the requirements of the space on height, these container bodies need to be supported at higher places while being used. However, it is similar to another characteristic of these container bodies that they need to be moved or transported more or less. In this case, the transportation cost for this product is higher when a space occupied by the product in the height direction is larger.

Therefore, the problem that the module for building container bodies occupies a relatively large space in the height direction during the transportation process exists in the prior art.

SUMMARY

The disclosure aims at providing a spatial integration module to solve the problem that the module for building container bodies occupies a relatively large space in the height direction during the transportation process.

To solve the technical problems, the disclosure adopts the following technical scheme.

A spatial integration module, comprising a chassis, a wall body, a top cover and supporting devices. Each supporting device comprises a lower fixed portion and an upper movable portion. The wall body is detachably connected to the chassis and/or the supporting devices. Each fixed portion is mounted on the chassis. A fixed rotation structure is arranged at a position where each movable portion is connected to the corresponding fixed portion, and each movable portion is turned between a horizontal direction state and a vertical direction state by the rotation structure.

The rotation structure is rotatably connected to the fixed portion and the movable portion. The rotation structure comprises a rotary shaft by which the movable portion is turned around the fixed portion, and the fixed rotation structure is a rotation structure in which the axis of the rotary shaft is not moved when the movable portion is turned around the fixed portion.

Furthermore, the supporting device further comprises a locking member, and the locking member is detachably connected between the movable portion and the fixed portion and is used for locking the movable portion in the vertical direction state.

Furthermore, four groups of supporting devices are arranged; a turning axis of each movable portion is arranged along the left-right direction; a cuboid-shaped container body can be built by the wall body, the top cover, the chassis and the supporting devices; the wall body comprises a front wall body, a rear wall body, a left wall body, and a right wall body.

Each movable portion in the container body is arranged in the vertical direction state and the top cover is detachably connected to the upper end of each movable portion; all the movable portions are distributed on four vertical edges of the container body; a bottom portion of the left wall body and a bottom portion of the right wall body are hinged to the chassis respectively, making the left wall body and the right wall body be downward turned toward the outside of the container body; the rear wall body is arranged at the rear part of the container body and the front wall body is arranged at the front part of the container body.

Furthermore, in the container body, crossbeam members are arranged between the upper ends of the two movable portions located at the front part, between the upper ends of the two movable portions located at the rear part, between the upper ends of the two movable portions located at the left part, and between the upper ends of the two movable portions located at the right part, respectively.

The upper end of the left wall body is detachably connected to the crossbeam member located at the left part; the upper end of the right wall body is detachably connected to the crossbeam member located at the right part; the upper end of the rear wall body is detachably connected to the crossbeam member located at the rear part; and the upper end of the front wall body is detachably connected to the crossbeam member located at the front part.

Furthermore, the right wall body is detachably connected to the chassis and the left wall body is detachably connected to the chassis; the front wall body can be backward turned to the horizontal direction state along the two movable portions located at the front part; the rear wall body can be frontward turned to the horizontal direction state along the two movable portions located at the rear part.

After the front wall body is backward turned to the horizontal direction state and the rear wall body is frontward turned to the horizontal direction state, the front wall body and the rear wall body are overlapped on the chassis according to a rule of one is placed on top of the other one; the detached left wall body and right wall body can be overlapped at the position between each two fixed portions above the chassis; and the detached top cover can be detachably connected to the upper part of each fixed portion.

Furthermore, the container body is internally provided with a monitor, an alarm, and a GPS; the monitor is used for monitoring entering and exiting conditions of staff; the alarm is used for giving an alarm when strangers intrude into the container body; and the GPS is used for providing location information of the container body.

Furthermore, the front wall body and/or the rear wall body can be upward or downward turned toward the outside of the container body.

Furthermore, the chassis is detachably connected to a traction frame; the chassis is detachably connected to wheel frames; and wheels are arranged on the wheel frames.

Furthermore, traction frame inserting holes are formed in the chassis; the traction frame is provided with traction frame inserting blocks capable of being inserted into the traction frame inserting holes; and a traction frame pin is arranged between each traction frame inserting block and the corresponding traction frame inserting hole.

Furthermore, wheel frame inserting holes are formed in the chassis; each wheel frame is provided with a wheel frame inserting block capable of being inserted into the corresponding wheel frame inserting hole; and a wheel frame pin is arranged between each wheel frame inserting block and the corresponding wheel frame inserting hole.

Furthermore, one wheel frame inserting hole and one traction frame inserting hole are formed in each of the front side, rear side, left side, and right side of the chassis.

Furthermore, a hoisting hole is formed in the top cover.

Furthermore, a connection block is arranged at each of four corners of the top cover; a top cover inserting piece is arranged at the bottom portion of each connection block; and a top cover inserting hole matched with the top cover inserting piece is formed in the upper end of each movable portion.

Furthermore, a bottom connection block is arranged at each of four corners of the chassis; each bottom connection block is connected to a wheel device; each wheel device comprises the wheel frame, the wheel inserting block connected to the wheel frame, and the wheel frame pin inserted into the wheel inserting block; the wheel frame pins are horizontally arranged; the wheel frame inserting hole for inserting the wheel frame and a limiting hole for placing the pin are formed in each bottom connection block; and the limiting holes are horizontally formed and the wheel frame inserting holes are vertically formed.

The disclosure has the beneficial effects that the disclosure provides a spatial integration module.

1. According to the disclosure, the movable portion can be turned between the vertical direction state and horizontal direction state by means of arranging the fixed rotation structure, so that the force for turning can be reduced in the turning process of the movable portion and the safety of the turning work is improved. The wall body is detachably connected to the chassis and/or the supporting devices, which makes the wall body be easily put down and a turning structure be turned to the horizontal direction state. In this way, the space occupied by the module in the transportation and transfer processes is reduced. The hoisting hole is formed in the top cover and is used for connecting a pull rope for hoisting or a pull hook for hoisting. The hoisting hole is formed so that a working shaft of the top cover is easy to detach. The connection block is arranged at each of four corners of the top cover, the top cover inserting piece is arranged at the bottom portion of each connection block, and the top cover inserting hole matched with the top cover inserting piece is formed in the upper end of each movable portion. This makes the top cover be rapidly detached.
2. The spatial integration module provided by the disclosure can be easily expanded outward to enlarge the space and area, so that it can be applied to construction and placement of house buildings and the like.
3. The spatial integration module provided by the disclosure is easy to fold, thus reducing the transportation cost.
4. The spatial integration module provided by the disclosure can be rapidly assembled, detached, or folded.
5. The wall body of the spatial integration module provided by the disclosure is detachable so that a plurality of groups of modules can be easily combined, and furthermore, the space is easy to expand.
6. The spatial integration module provided by the disclosure can improve the flexibility and working efficiency of movement.

DESCRIPTION OF THE EMBODIMENTS

Figure 1:
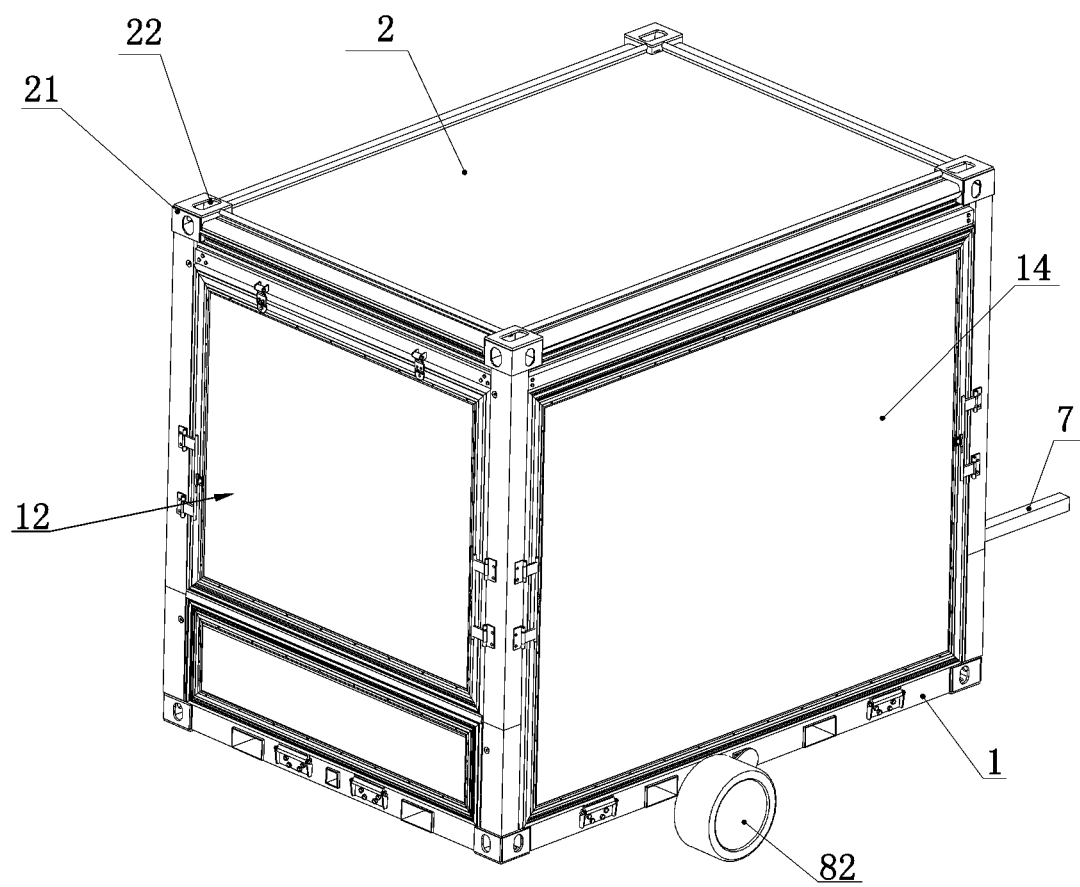
FIG. 1 is a schematic diagram illustrating a spatial integration module in a container body condition.

In the detailed description of the disclosure, the direction of an edge in one direction of the chassis is defined as the front-rear direction and the direction of an edge in the other direction is defined as the left-right direction. By defining "front", "rear", "left", and "right" directions, the disclosure can be easily described.

Example I

As shown in FIG. 1 to FIG. 4, the spatial integration module comprises a chassis 1, a wall body, a top cover 2 and supporting devices 3. Each of the supporting devices 3 comprises a lower fixed portion 31 and an upper movable portion 32. The wall body is detachably connected to the chassis 1 and/or the supporting devices 3 through bolts, certain detachable hinging structures, or certain container body bolt devices and the like in the prior art. Each fixed portion 31 is mounted on the chassis 1. A fixed rotation structure is arranged at a position where each movable portion 32 is connected to the corresponding fixed portion 31, and each movable portion 32 is turned between the horizontal direction state and the vertical direction state by the rotation structure. The rotation structure is rotatably connected to the fixed portion 31 and the movable portion 32. The rotation structure comprises a rotary shaft 4 by which the movable portion 32 is turned around the fixed portion 31, and the fixed rotation structure is a rotation structure in which the axis of the rotary shaft 4 is not moved when the movable portion 32 is turned around the fixed portion 31. The supporting device 3 further comprises a locking member 5 and the locking member 5 is detachably connected between the movable portion 32 and the fixed portion 31, and the locking member 5 is used for locking the movable portion 32 in the vertical direction state.

As shown in FIG. 1 to FIG. 4, the movable portion 32 can be turned between the vertical direction state and horizontal direction state by means of arranging the fixed rotation structure in the disclosure, so that the force for turning can be reduced in the turning process of the movable portion 32 and the safety of the turning work is improved. The wall body is detachably connected to the chassis and/or the supporting devices, which makes the wall body be easily put down and a turning structure be turned to the horizontal direction state. In this way, the space occupied by the module in the transportation and transfer processes is reduced. The hoisting hole 22 is formed in the top cover 2 and is used for connecting a pull rope for hoisting or a pull hook for hoisting. The hoisting hole 22 is formed so that a working shaft of the top cover is easy to detach. The connection block 21 is arranged at each of four corners of the top cover 2, the top cover inserting piece 23 is arranged at the bottom portion of each connection block 21, and the top cover inserting hole 19 matched with the top cover inserting piece is formed in the upper end of each movable portion. This makes the top cover be rapidly detached.

As shown in FIG. 1 to FIG. 4, four groups of supporting devices 3 are arranged. The turning axis of each movable portion 32 is arranged along the left-right direction. A cuboid-shaped container body can be built by the wall body, the top cover 2, the chassis and the supporting devices 3. The wall body comprises a front wall body 11, a rear wall body 12, a left wall body 13, and a right wall body 14. Each movable portion 32 in the container body is arranged in the vertical direction state and the top cover 2 is detachably connected to the upper end of each movable portion 32. All the movable portions 32 are distributed on four vertical edges of the container body. The bottom portion of the left wall body 13 and the bottom portion of the right wall body 14 are hinged to the chassis 1 respectively, making the left wall body 13 and the right wall body 14 be downward turned toward the outside of the container body. The rear wall body 12 is arranged at the rear part of the container body and the front wall body 11 is arranged at the front part of the container body. After the left wall body 13 and the right wall body 14 are downward turned toward the outside of the container body, the left and right sides of the container body are opened. This facilitates the space expansion. After the left wall body 13 and the right wall body 14 are downward turned toward the outside until reaching the ground, the area occupied by the bottom portion of the expanded container body in the left-right direction is easy to expand. For example, in activities such as camping, based on this structure, the space can be easily expanded outward, and the expanded space can also be easily folded. The container body built by all wall bodies can be used for living, freight transportation and the like. The wall bodies at the lateral sides are detachable so that a plurality of groups of the spatial integration modules provided by the disclosure can be spliced. The spatial integration module can be easily expanded outward to enlarge the space, so that it can be applied to construction of building spaces for living.

Figure 2:
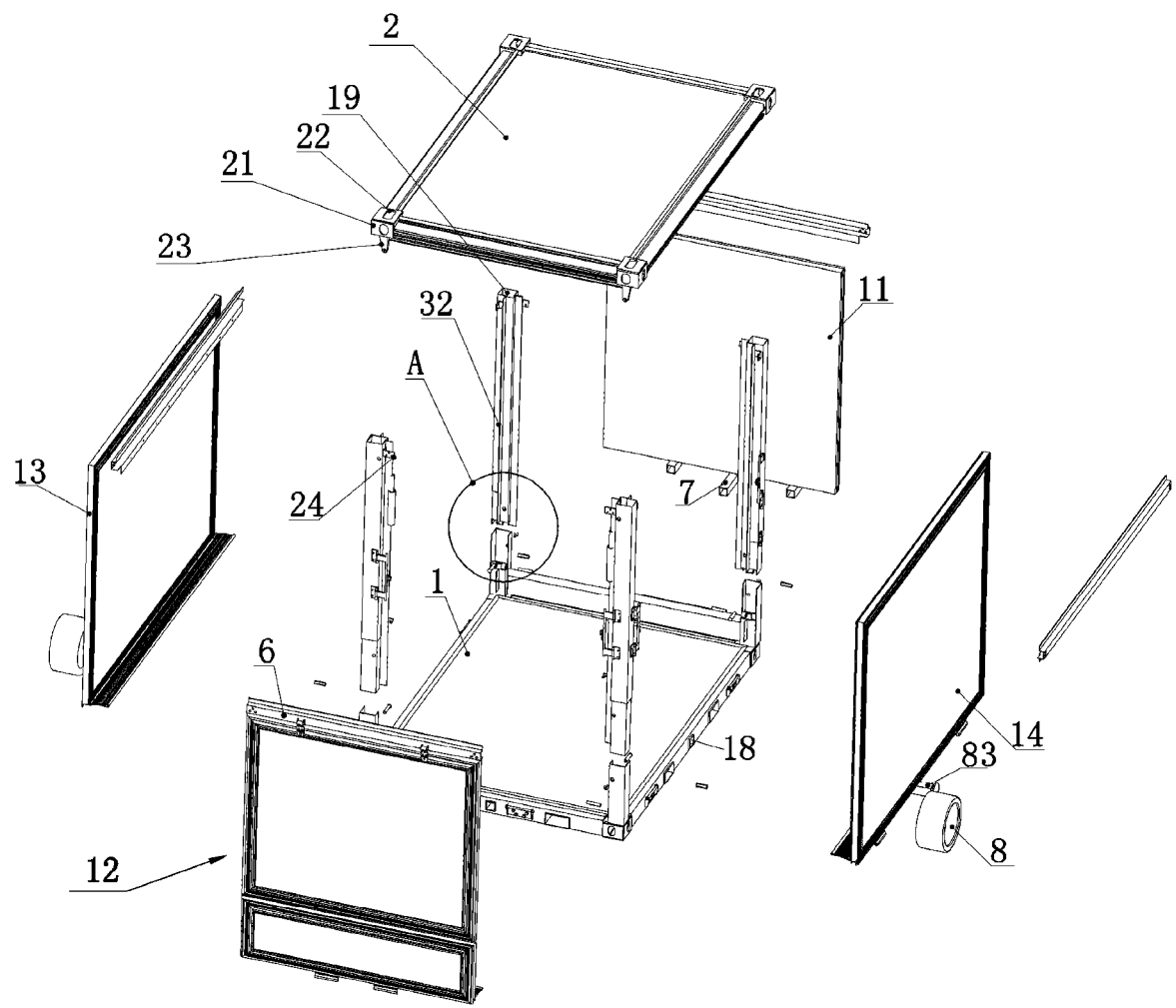
FIG. 2 is an explosive view of FIG. 1.
Figure 3:
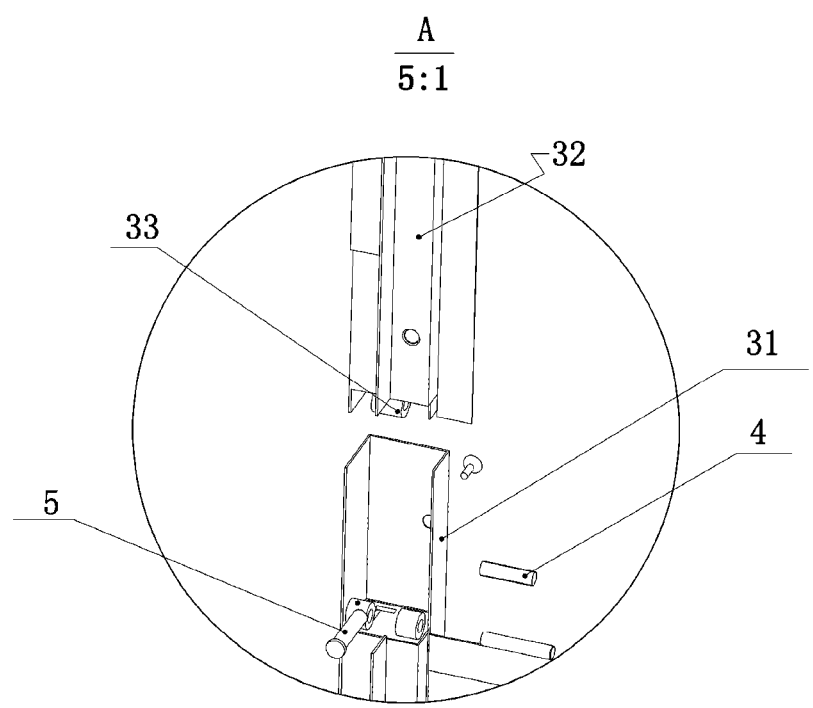
FIG. 3 is an enlarged view of part A in FIG. 2.

As shown in FIG. 1 and FIG. 2, in the container body, crossbeam members 6 are arranged between the upper ends of the two movable portions 32 located at the front part, between the upper ends of the two movable portions located at the rear part, between the upper ends of the two movable portions located at the left part, and between the upper ends of the two movable portions located at the right part, respectively. For example, an ear plate piece 24 is welded on or detachably connected to each movable portion 32, and the crossbeam members 6 are detachably connected to the ear plate pieces 24 through bolts. The upper end of the left wall body 13 is detachably connected to the crossbeam member located at the left part. The upper end of the right wall body is detachably connected to the crossbeam member located at the right part. The upper end of the rear wall body is detachably connected to the crossbeam member located at the rear part. The upper end of the front wall body is detachably connected to the crossbeam member located at the front part. The container body is internally provided with a monitor, an alarm, and a GPS. The monitor is used for monitoring entering and exiting conditions of staff. The alarm is used for giving an alarm when strangers intrude into the container body. The GPS is used for providing location information of the container body. The spatial integration module provided by the disclosure can be used as a liner box or transfer box to transport cargoes, especially valuables. By setting the monitor and the alarm, the safety degree can be improved when the module is used to transfer cargoes.

As shown in FIG. 1 and FIG. 2, by arranging the crossbeam members 6, on one hand, the supporting stability of each movable portion in the vertical direction state can be enhanced when the spatial integration module is in a container body condition. On the other hand, the upper end of the wall body can be conveniently connected to the crossbeam members through bolts. Therefore, if the wall body does not need to be turned, the container body can be retained in the vertical direction state. The crossbeam members are detachably connected to the wall body and the wall body is easy to release, so that the wall body can be turned easily.

Figure 8:
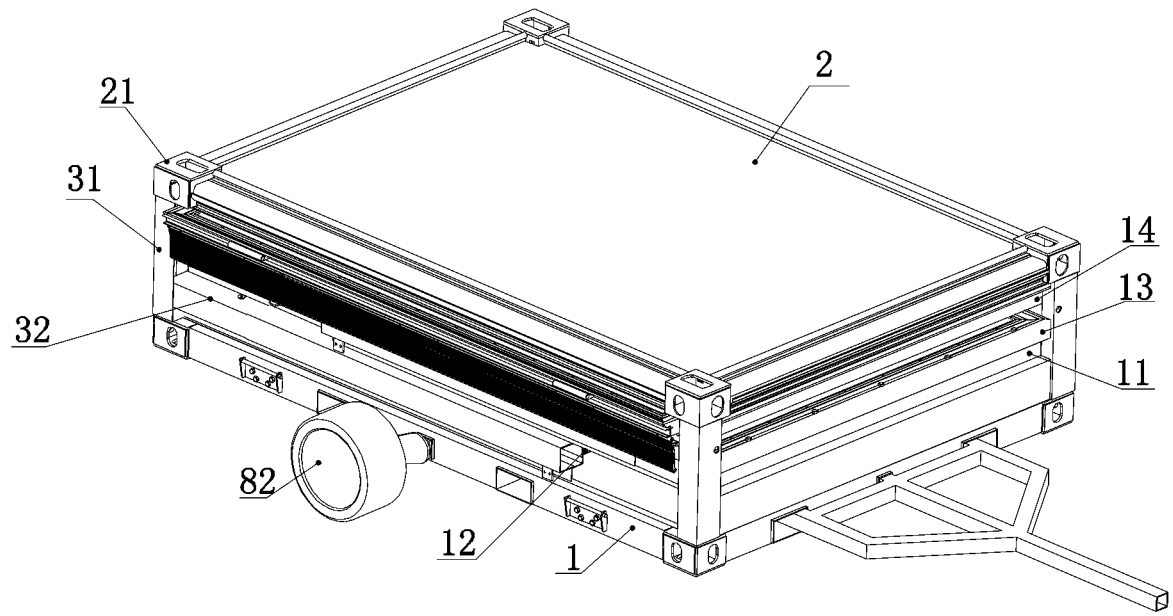
FIG. 8 is a schematic diagram of the spatial integration module in a folded condition.
Figure 9:
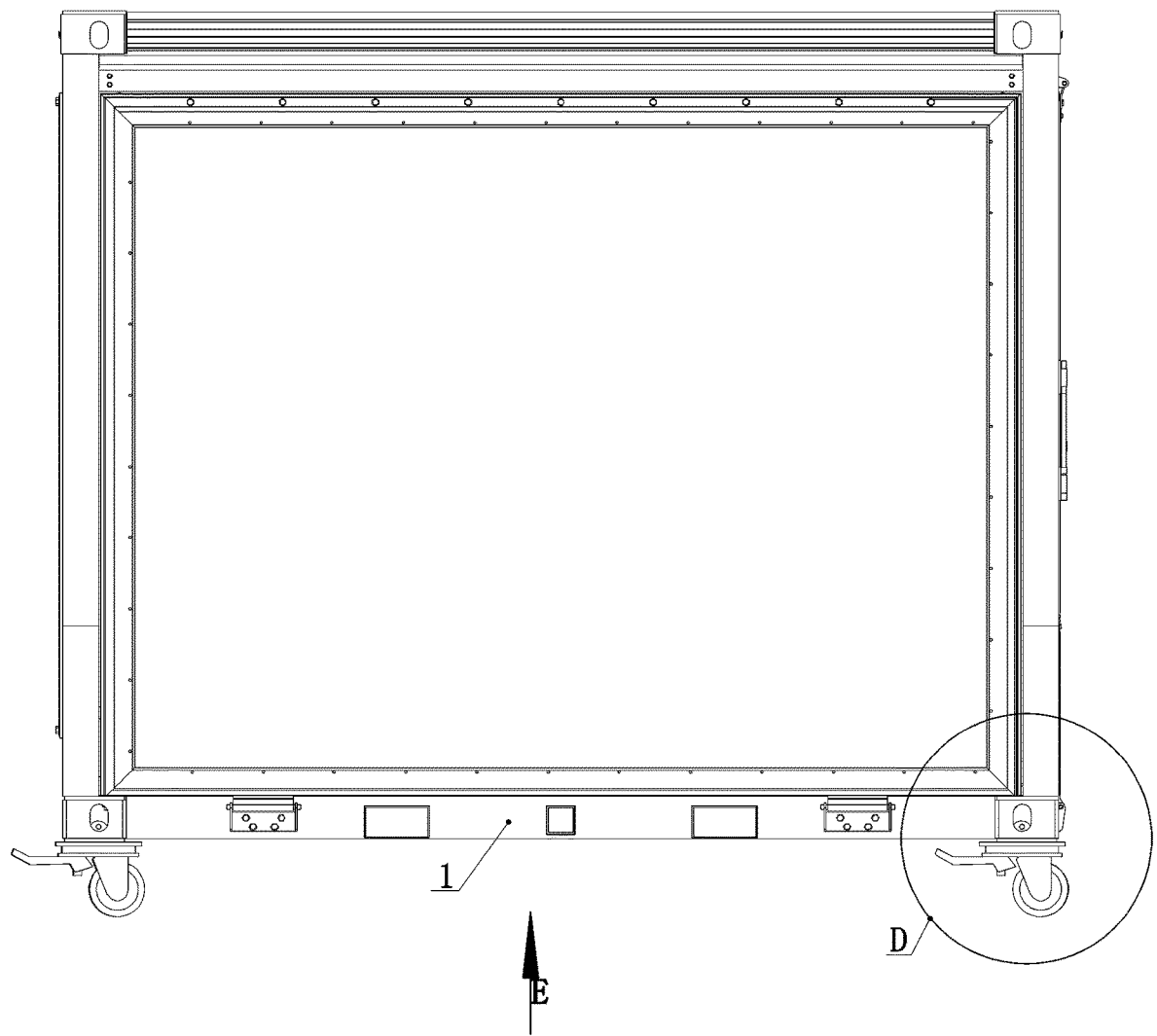
FIG. 9 is example II of a wheel.
Figure 10:
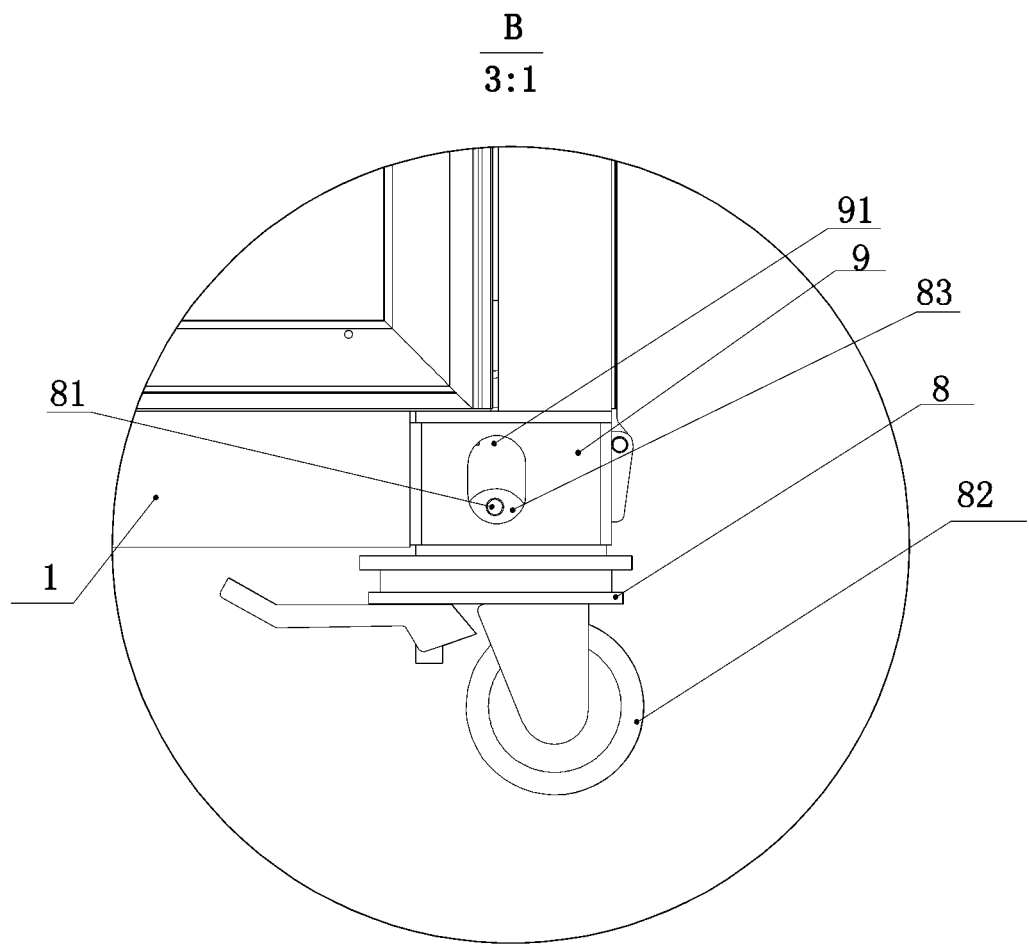
FIG. 10 is an enlarged view of part D in FIG. 9.
Figure 11:
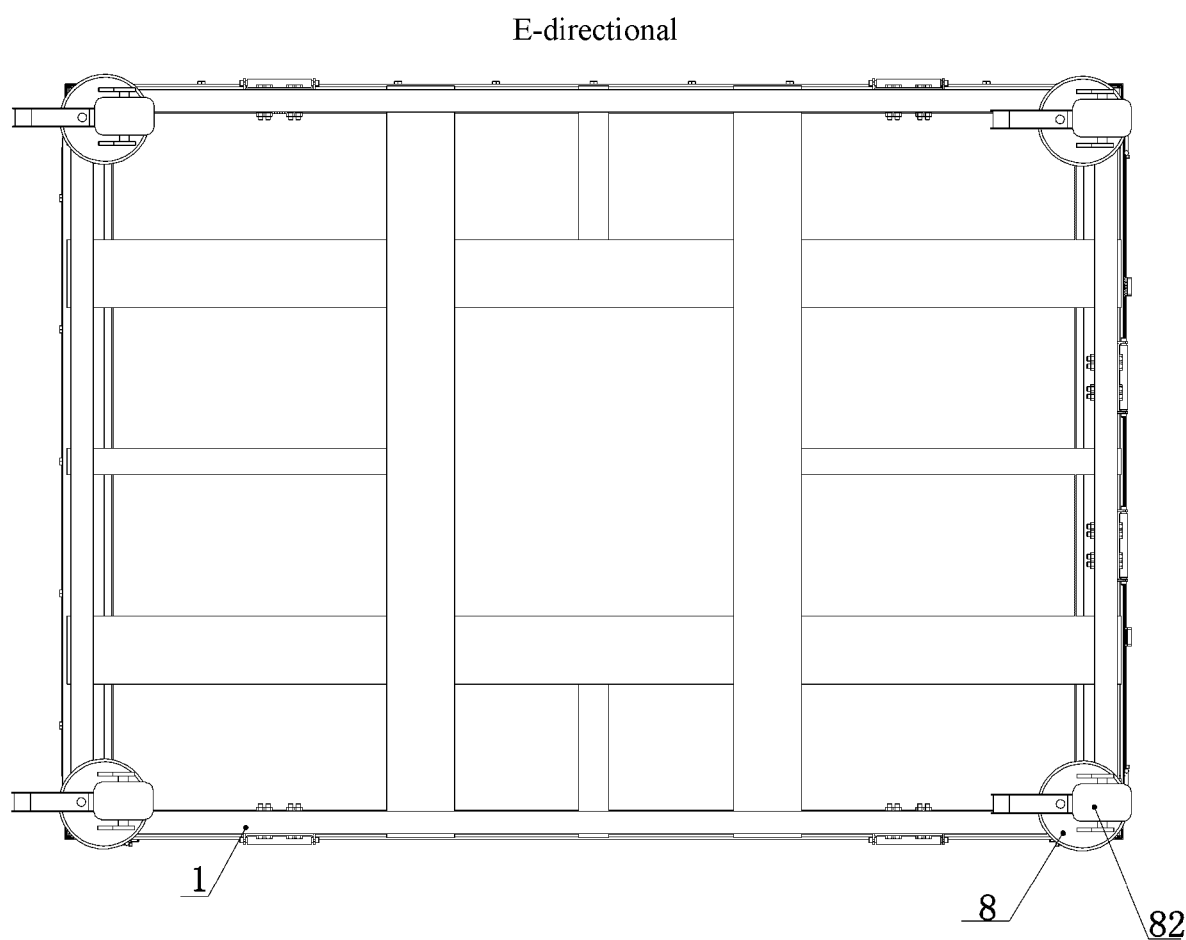
FIG. 11 is an E-directional view of FIG. 9.

As shown in FIG. 2 and FIG. 8, the left wall body 14 is detachably connected to the chassis 1. The left wall body 13 is detachably connected to the chassis 1. The front wall body 11 can be backward turned to the horizontal direction state along two movable portions 32 located at the front part. The rear wall body 12 can be frontward turned to the horizontal direction state along two movable portions 32 located at the rear part. After the front wall body 11 is backward turned to the horizontal direction state and the rear wall body 12 is frontward turned to the horizontal direction state, the front wall body and the rear wall body are overlapped on the chassis 1 according to the rule of one is placed on the top of the other one. The detached left wall body 13 and right wall body 14 can be overlapped at the position between each two fixed portions 31 above the chassis. The detached top cover 2 can be detachably connected to the upper part of each fixed portion 31. This makes the container body be wholly folded in the transportation process and the transportation space can be greatly saved during this process.

Figure 4:
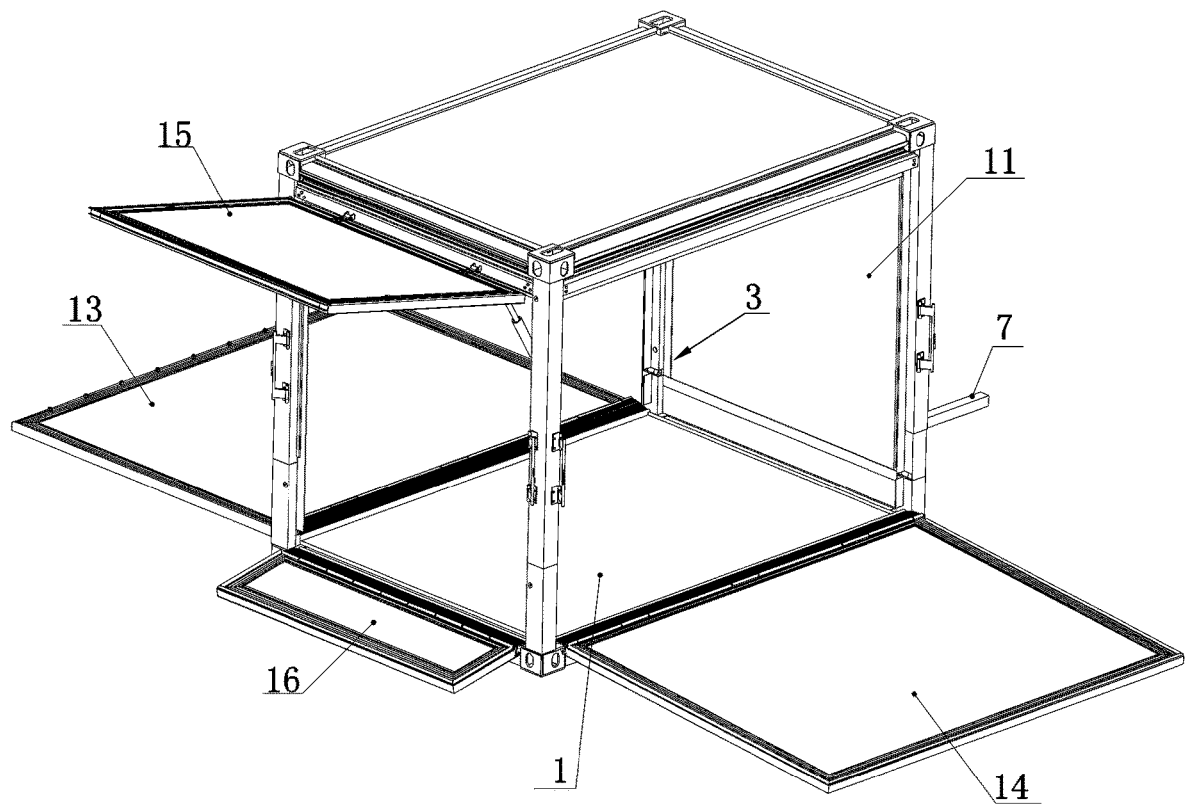
FIG. 4 is a schematic diagram of the container body in an expanded condition.
Figure 5:
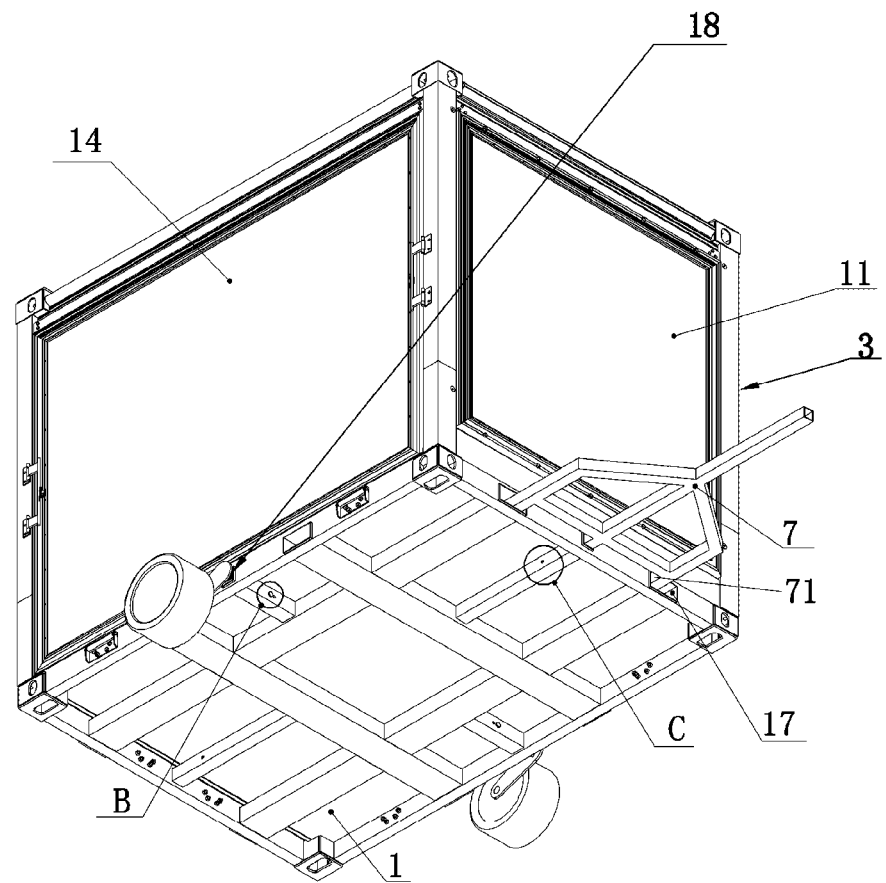
FIG. 5 is a schematic diagram illustrating a setting form of traction frames and wheel frames in the spatial integration module.
Figure 6:
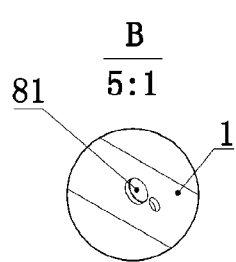
FIG. 6 is an enlarged view of part B in FIG. 5.
Figure 7:
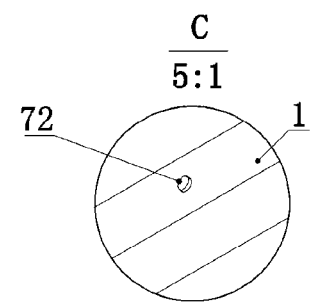
FIG. 7 is an enlarged view of part C in FIG. 5.

As shown in FIG. 1 and FIG. 4, the front wall body 11 and/or the rear wall body 12 can be turned toward the outside of the container body in the upward or downward direction. This makes the space of the container body be easily expanded in the left-right direction of the front container body. The rear wall body 12 can also be integral wall body. Alternatively, the rear wall body 12 can be divided into an upper turning portion 15 for turning upward and a lower turning portion 16 for turning downward.

As shown in FIG. 5 to FIG. 8, the chassis 1 is detachably connected to a traction frame 7. The chassis 1 is detachably connected to wheel frames 8, and wheels 82 are arranged on the wheel frames 8. The wheel frames 8 and/or the traction frame 7 can be mounted on the chassis 1 according to actual environment requirements, making the spatial integration module be easily transferred in a container body condition or folded condition.

As shown in FIG. 5 to FIG. 8, traction frame inserting holes 17 are formed in the chassis 1. The traction frame 7 is provided with traction frame inserting blocks 71 capable of being inserted into the traction frame inserting holes 17. A traction frame pin 72 is arranged between each traction frame inserting block 71 and the corresponding traction frame inserting hole 17. This makes the traction frame 7 be easily and rapidly detached and improves the efficiency of transferring the spatial integration module.

As shown in FIG. 5 to FIG. 8, wheel frame inserting holes 18 are formed in the chassis 1. Each wheel frame is provided with a wheel frame inserting block 83 capable of being inserted into the corresponding wheel frame inserting hole 18. A wheel frame pin 81 is arranged between each wheel frame inserting block 83 and the corresponding wheel frame inserting hole 18. This improves the speed of detaching or installing the wheels on the chassis 1 and improves the efficiency of transferring the spatial integration module. The wheel frame inserting holes and the traction frame inserting holes are formed in the front side, rear side, left side, and right side of the chassis 1, respectively. This makes the directions of the wheels and the traction direction be easily selected, and improves the flexibility of movement.

Example II

As shown in FIG. 8 to FIG. 11, a bottom connection block 9 is arranged at each of four corners of the chassis 1. Each bottom connection block is connected to a wheel device. Each wheel device comprises the wheel frame 8, the wheel inserting block 83 connected to the wheel frame, and the wheel frame pin 81 inserted into the wheel inserting block. The wheel frame pins are horizontally arranged. The wheel frame inserting hole for inserting the wheel frame and a limiting hole 91 for placing the pin are formed in each bottom connection block. The limiting holes are horizontally formed and the wheel frame inserting holes are vertically formed.

This facilitates the movement of the whole container body, and the action of the wheels in this example will not be influenced even if wall body plates are turned downward.

What is claimed is:

1. A spatial integration module, comprising a chassis, a wall body, a top cover and supporting devices, wherein each of the supporting devices comprises a fixed portion at a lower part and a movable portion at an upper part; the wall body is detachably connected to the chassis and/or the supporting devices; each fixed portion is mounted on the chassis; a fixed rotation structure is arranged at a position where each movable portion is connected to the corresponding fixed portion; and each movable portion is turned between a horizontal direction state and a vertical direction state by the rotation structure.

2. The spatial integration module of claim 1, wherein each of the supporting devices further comprises a locking member, and the locking member is detachably connected between the movable portion and the fixed portion; and the locking member is configured for locking the movable portion in the vertical direction state.

3. The spatial integration module of claim 1, wherein four groups of the supporting devices are arranged; a turning axis of each movable portion is arranged along a left-right direction; a cuboid-shaped container body is built by the wall body, the top cover, the chassis and the supporting devices; the wall body comprises a front wall body, a rear wall body, a left wall body, and a right wall body;

each movable portion in the container body is arranged in the vertical direction state and the top cover is detachably connected to an upper end of each movable portion; all the movable portions are distributed on four vertical edges of the container body; a bottom portion of the left wall body and a bottom portion of the right wall body are hinged to the chassis respectively, such that the left wall body and the right wall body are turned downward toward an outside of the container body; the rear wall body is arranged at a rear part of the container body and the front wall body is arranged at a front part of the container body.

4. The spatial integration module of claim 3, wherein in the container body, crossbeam members are respectively arranged between the upper ends of two of the movable portions located at the front part, between the upper ends of two of the movable portions located at the rear part, between the upper ends of two of the movable portions located at a left part of the container body, and between the upper ends of two of the movable portions located at a right part of the container body;

an upper end of the left wall body is detachably connected to the crossbeam member located at the left part; an upper end of the right wall body is detachably connected to the crossbeam member located at the right part; an upper end of the rear wall body is detachably connected to the crossbeam member located at the rear part; and an upper end of the front wall body is detachably connected to the crossbeam member located at the front part.

5. The spatial integration module of claim 3, wherein the right wall body is detachably connected to the chassis and the left wall body is detachably connected to the chassis; the front wall body is able to be turned backward to the horizontal direction state along the two movable portions located at the front part; the rear wall body is able to be turned frontward to the horizontal direction state along the two movable portions located at the rear part;

after the front wall body is backward turned to the horizontal direction state and the rear wall body is frontward turned to the horizontal direction state, the front wall body and the rear wall body are overlapped on the chassis according to a rule of one is placed on top of the other one; the detached left wall body and right wall body is able to be overlapped at a position between each two fixed portions above the chassis; and the detached top cover is able to be detachably connected to the upper part of each fixed portion.

6. The spatial integration module of claim 3, wherein the container body is internally provided with a monitor, an alarm, and a global positioning system (GPS); the monitor is configured for monitoring entering and exiting conditions of staff; the alarm is configured for giving an alarm when strangers intrude into the container body; and the GPS is configured for providing location information of the container body.

7. The spatial integration module of claim 3, wherein the front wall body and/or the rear wall body is able to be upward or downward turned toward the outside of the container body.

8. The spatial integration module of claim 1, wherein the chassis is detachably connected to a traction frame; the chassis is detachably connected to wheel frames; and wheels are arranged on the wheel frames.

9. The spatial integration module of claim 8, wherein traction frame inserting holes are formed in the chassis; the traction frame is provided with traction frame inserting blocks capable of being inserted into the traction frame inserting holes; and a traction frame pin is arranged between each traction frame inserting block and the corresponding traction frame inserting hole.

10. The spatial integration module of claim 8, wherein wheel frame inserting holes are formed in the chassis; each wheel frame is provided with a wheel frame inserting block capable of being inserted into the corresponding wheel frame inserting hole; and a wheel frame pin is arranged between each wheel frame inserting block and the corresponding wheel frame inserting hole.

11. The spatial integration module of claim 1, wherein a bottom connection block is arranged at each of four corners of the chassis; each bottom connection block is connected to a wheel device; each wheel device comprises a wheel frame, a wheel inserting block connected to the wheel frame, and a wheel frame pin inserted into the wheel inserting block; the wheel frame pins are horizontally arranged; a wheel frame inserting hole for inserting the wheel frame and a limiting hole for placing the pin are formed in each bottom connection block; and the limiting holes are horizontally formed, and the wheel frame inserting holes are vertically formed.

12. The spatial integration module of claim 2, wherein four groups of the supporting devices are arranged; a turning axis of each movable portion is arranged along a left-right direction; a cuboid-shaped container body is built by the wall body, the top cover, the chassis and the supporting devices; the wall body comprises a front wall body, a rear wall body, a left wall body, and a right wall body;

each movable portion in the container body is arranged in the vertical direction state and the top cover is detachably connected to an upper end of each movable portion; all the movable portions are distributed on four vertical edges of the container body; a bottom portion of the left wall body and a bottom portion of the right wall body are hinged to the chassis respectively, such that the left wall body and the right wall body are turned downward toward an outside of the container body; the rear wall body is arranged at a rear part of the container body and the front wall body is arranged at a front part of the container body.

* * * * *